United States Patent [19]

Quick

[11] 4,276,118

[45] Jun. 30, 1981

[54] DEINKING WASTE ELECTROPHOTOGRAPHY COPY PAPER

[75] Inventor: Thomas H. Quick, Sumner, Wash.

[73] Assignee: Weyerhaeuser Company, Tacoma, Wash.

[21] Appl. No.: 83,139

[22] Filed: Oct. 9, 1979

[51] Int. Cl.³ .............................................. D21L 5/02
[52] U.S. Cl. ........................................... 162/5; 162/55
[58] Field of Search .................................. 162/4, 5, 55

[56] References Cited

U.S. PATENT DOCUMENTS

| | | |
|---|---|---|
| 2,638,416 | 5/1953 | Walkup et al. |
| 2,735,785 | 2/1956 | Greig |
| 2,753,308 | 7/1956 | Landrigan ............................ 252/62 |
| 3,635,789 | 1/1972 | Green ...................................... 162/5 |
| 3,764,460 | 10/1973 | Miyamoto et al. ..................... 162/5 |
| 4,076,578 | 2/1978 | Puddington et al. .................... 162/5 |

FOREIGN PATENT DOCUMENTS 2,756,711  5/1976  Fed. Rep. of Germany.

Primary Examiner—William F. Smith
Attorney, Agent or Firm—Weyerhaeuser Company

[57] ABSTRACT

The toners used for printing in the electrophotography processes such as xerography or laser printing are removed from copy paper. In the process, the paper is pulped to form an aqueous slurry. The toner is removed from the paper with a dual system of a collector and a collecting chemical.

The best collectors have solubility parameters similar to the toners so that the softened toner is slightly soluble in the collector. These include polystyrene, polyvinyl chloride and polyacrylates, e.g., polymethyl methacrylates. Other collectors which are operable but less satisfactory are polyurethane and polypropylene. The collector is in the form of prills, beads or sheets. The specific collector will depend upon the specific chemicals in the toner.

There are a number of requirements for the collecting chemical. It should be substantially insoluble in water. It should have a melting point that is at or below the approximate softening point of the toner or collector. It should be a saturated aliphatic primary alcohol, a mixture of such alcohols, an unsaturated aliphatic primary alcohol, a mixture of such unsaturated alcohols, a saturated secondary alcohol, a saturated aliphatic primary hydrocarbon, a mixture of such hydrocarbons, or a mixture of hydrocarbons and alcohols.

The process is operable at or above the melting point of the collecting chemical, and at a temperature at which the toner is softened, generally 38°–75° C.

10 Claims, No Drawings

DEINKING WASTE ELECTROPHOTOGRAPHY COPY PAPER

BACKGROUND OF THE INVENTION

1. Field of the Invention

The invention relates to the art of removing toners from waste paper.

2. Description of the Prior Art

It is necessary to remove the ink from pulp fiber when processing waste paper for reuse. In the past these have been oil based inks which were removed by saponification reactions. There is, however, an increasing amount of waste paper which has been used as copy paper in an electrophotography process such as xerography or laser printing. These papers usually include synthetic resins and plasticizers, and normal deinking procedures and chemicals are not effective in removing these resins and plasticizers from the fibers and in separating them from the pulp.

In the art of xerography, an electrostatic latent image is formed by uniformly charging a photoconductive insulating surface on a xerographic plate followed by exposing the charged surface to a pattern of light. The latent image formed by this technique is then developed with electroscopic powder, also known as a toner, to form a powdered image which is then transferred to a sheet of normal bond paper. This powder image now contained on a paper is then fused into the paper to form a permanent reproduction of an original image. The usual toner powder is carbon black mixed with a styrene-acrylic copolymer as a binder.

One technique now in general use in developing xerographic images is cascade development. This technique is based on the phenomena of triboelectrification whereby upon bringing two similar materials into contact each material becomes electrically charged to a polarity opposite to that of the other. Thus, when the fine powdered toner is mixed with a relatively coarse beaded carrier, the toner particles become charged triboelectrically and cling to the surface of the carrier beads. Development of the electrostatic image is accomplished by falling or cascading the two component developer over the surface of the xerographic plate. As the beads, covered with toner, roll over the image, the electrostatic forces of the image overcome the carrier-toner bond and toner particles are deposited on the image areas. An example of the toner composition of this type is 25% polyvinylbutyral, 70% of a rosin modified phenol-formaldehyde and 5% carbon black. Patents disclosing these inks are Landrigan U.S. Pat. No. 2,753,308, Walkup et al. U.S. Pat. No. 2,638,416 and Grieg et al. U.S. Pat. No. 2,735,785.

One patent directed toward the removal of toners is Green U.S. Pat. No. 3,635,789. This is a two-step system in which the copy paper is repulped, diluted and agitated and the toner is skimmed from the surface. The pulp is transferred to a second tank and an immiscible organic liquid is added to the surface of the solution. The toner is again skimmed from the surface.

Fischer and Pfalzer Auslegeschrift No. 2,756,711 describes a process of deinking wastepaper by soaking the paper with a surface active material and treating it with terpene hydrocarbons or alcohols, aliphatic or aromatic hydrocarbons or alcohols, and collecting the ink on a calcium soap or magnesium soap accumulator. The accumulators may be calcium soap cones with pine oil. It was preferred, however, and the object of the Fischer, et al. invention to use less soap in the accumulator by absorbing the soap into the surface of a carrier material and using this as the accumulator. The materials used as the carriers for the soap have large specific surfaces. Examples are groundwood, sawdust, porous plastic particles and bark waste. In place of calcium or magnesium soap, oleic acid may be absorbed on the surface and then be saponified with lime. Other chemicals such as amines, petroleum or glycol esters may be used in place of the calcium soap.

Miyamoto et al. U.S. Pat. No. 3,764,460 discloses a deinking process in which the paper is pulped in an aqueous system containing a polyolefin dispersed or emulsified in micro-fine particles with a surface active agent such as a dispersing agent or emulsifier. The printing inks are desorbed from the printed paper and absorbed on the polyolefin particles which are then isolated from the system. It is helpful in isolating the waste to add organic solvents, emulsions containing the solvents, clays or water soluble salts capable of dissociating the di- or polyvalent metal cation in water.

Both of these patents are also discussed in Puddington U.S. Pat. No. 4,076,578. The process in this latter patent again requires forming a pulp, precipitating any ink dispersing agent present in the pulp and agitating the resulting aqueous mixture in the presence of inserted selected non-soap collecting solids and collecting ink solids on the surface of the collecting solids. The collecting solids are selected from materials having hydrophobic surfaces with a strong affinity for the ink particles such as waxes, polyolefins and other vinyl polymers, rubber, e.g. ground waste rubber, solid petroleum materials, pitches, gums, sulfur, silica with surface hydroxyls replaced with hydrophobic organic groups, etc. If the collecting surface has insufficient attraction for retention of ink particles, the surface is coated with a hydrophobic adhesive collecting agent. These agents would include sticky viscous oils, soft waxes, sticky gums and hydrophobic contact adhesives in small amounts.

One method to remove toner proposed by DeSoto, Inc. is to treat the copy paper at 4–5% consistency with 2–3% caustic and 1–2% surfactant DeSoInk #652. The amount of caustic and DeSoInk is based on the weight of the paper. The time of the treatment is 15–20 minutes and the temperature 160°–170° F. The toner is supposed to form into balls and be removed by centrifuging and reverse centrifuging. It has been found, however, that this method requires a heavy coating of toner to be effective. It is not effective in removing substantially all of the toner if the paper is covered with only a light or averge amount of toner.

SUMMARY OF THE INVENTION

The toners used in electrophotographic copying are usually thermoplastic polymers which are inert to the saponification reactions normally used to remove oil based inks. It has now been found that the toner may substantially be removed using a dual system of a collecting chemical to remove or agglomerate the toner and a collector to which the toner attaches.

The collectors which work best have solubility parameters similar to the toners so that the softened toner is slightly soluble in the collector. These are polystyrene foam prills or solids, polyvinyl chloride foam and solids, or polyacrylate solids, e.g., polymethyl methacrylate solids. Others which have been used but which work less well are polyurethanes and polypropylenes. The former collectors allow a pulp having zero to five specks per gram to be produced, while the latter do not.

The collecting chemicals should be substantially insoluble in water, have a melting point that is at or below the softening point of the toner or collector, and be a saturated aliphatic primary alcohol, a mixture of such alcohols, an unsaturated aliphatic primary alcohol, a mixture of such unsaturated alcohols, a saturated secondary alcohol, a saturated aliphatic primary hydrocarbon, a mixture of such hydrocarbons, or a mixture of such hydrocarbons and the above alcohols. Examples of available compounds useful as collecting chemicals are a saturated aliphatic primary alcohol having a chain length of from 8 through 22 carbon atoms, a mixture of such alcohols, an unsaturated aliphatic primary alcohol having a chain length of 8 through 22 carbon atoms, a mixture of such alcohols, a saturated aliphatic secondary alcohol having a chain length of 8 carbon atoms, a saturated aliphatic primary hydrocarbon having a chain length of 7 through 28 carbon atoms and a mixture of such hydrocarbons.

The paper would be pulped to form an aqueous slurry having a mixable consistency, 2-8%, and the chemical would be added in amount greater than 0.75% of the weight of the pulp fiber and the collectors would be present in an amount of from 0.25% to around 5% of the weight of the pulp fiber. The temperature of the pulp slurry should be at or above both the melting point of the collecting chemical and the softening point of the toner.

DESCRIPTION OF THE PREFERRED EMBODIMENTS

The waste paper is pulped initially. The consistency of a pulp may be at any mixable level. This would usually be below 8%, and would range from 2-8%. Consistencies of 3 to 4% are normally used, 4% being the preferred consistency.

The collectors should be in a form that will not disintegrate during agitation. Prills, hardened plastic droplets of about five millimeters or less in diameter, have been found to work well. Softer material has a tendency to break up during agitation creating a problem of collecting the collectors. The best collectors are of a plastic that has a solubility parameter similar to the solubility parameter of the toner being used.

This criterion for polymer solubility is given by J. M. Prausnitz in "Molecular Thermodynamics of Fluid Phase Equilibria," *Prentice Hall* (1969), Chapter 7. As the solubility parameter $\delta_1$ approaches $\delta_2$, the Flory interaction parameter $x$ is minimized in a nonpolar system. When the solubility parameter $\delta_1$ equals $\delta_2$—the Flory interaction parameter is equal to zero—, the two components will mix athermally. The two molecules are similar enough in structure that they mix with no liberation or absorption of heat.

With the present toners, the collector materials found to work well are polystyrene foam prills or solids, polyvinyl chloride foam and solids, and polyacrylate solids, e.g., polymethyl methacrylate solids. Polyurethanes and polypropylenes do act as collectors but act less well than the polystyrene and polyvinyl chloride because the toners do not cling to the collectors as tenaciously as they do to the polystyrene, polyvinyl chloride or polyacrylates. Polyethylene has not been found to be effective.

The amount of collector is normally about 2% of the weight of the pulp fiber. Lesser amounts have been found to be effective and collectors have been used in amounts as low as 0.25% of the weight of the pulp fiber.

The collecting chemicals must satisfy a number of requirements. They must be substantially insoluble in water. They must have a melting point that is at or below the approximate softening point of the toner collector. They must be saturated aliphatic primary alcohols, a mixture of such alcohols, an unsaturated aliphatic primary alcohol, a mixture of such unsaturated alcohols, a saturated aliphatic secondary alcohol, a saturated aliphatic primary hydrocarbon, a mixture of such hydrocarbons, or a mixture of hydrocarbons and alcohols. Examples of available compounds useful as collecting chemicals are a saturated aliphatic primary alcohol having a chain length of 8 through 22 carbon atoms, e.g., 1-dodecanol, mixtures of such alcohols, unsaturated aliphatic primary alcohol having a chain length of 8 through 22 carbon atoms, e.g., oleyl alcohol, an unsaturated aliphatic secondary alcohol having a chain length of 8 carbon atoms, e.g., 2-octanol, and a saturated aliphatic primary hydrocarbon having a chain length of 7 through 28 carbon atoms, e.g., n-heptane or a mixture of such hydrocarbons, e.g., kerosene.

The chemicals should be present in amounts of at least 0.75% of the weight of the pulp fiber. They have been used in amounts up to 2.5% of the weight of the pulp fiber. The chemical usually is added initially, but some of the more volatile chemicals are best added at elevated temperatures. The chemical is usually added in one addition but chemicals having chain lengths of six or less carbon atoms have been found to work better if added sequentially during treatment.

The time of treatment may vary from one minute to one hour. Ten minutes to thirty minutes is the normal time of treatment. Treatment times of twenty to thirty minutes are usually required if the chemical is to be added sequentially. Most of the collection of the toner occurs immediately after the addition of the chemical once the pulp is at temperature.

The process temperature should be at or above the melting point of the collecting chemical. It is not good to operate below this temperature. Temperatures from 20° to 100° C. have been used. Collection seems best in the range of 40° to 80° C.

Normal repulping aids may also be added. Calcium chloride and sodium hydroxide have been used either singly or together. Calcium chloride in amounts of up to 3% of the weight of the pulp fiber and sodium hydroxide in any amount up to 2% of the weight of the pulp fiber have not interfered with the collection.

To illustrate the variety of methods of application, three examples using 1-octanol will be given. In each of these examples, the waste paper had a heavy coating of toner and the resulting pulp had less than 2 specks of toner per gram of pulp.

EXAMPLE 1

Waste xerographic copy paper was pulped and reduced to a 4% consistency. The pulp was heated to 40° C. and 1% 1-octanol, 2% polystyrene prills and 1% sodium hydroxide were added to the pulp. These percentages were based on the weight of the pulp fiber. The pulp was agitated and the toner collected on

EXAMPLE 2

Again waste xerographic copy paper was pulped and diluted to a consistency of 4% by weight. 3% calcium chloride, 2% sodium hydroxide and 2% polystyrene prills were added to the pulp slurry. These percentages were based on the weight of the pulp fiber. The pulp slurry was heated to 70° C. and maintained at this temperature for thirty minutes. 1-octanol was added to the slurry, 1% after the temperature reached 70° C., 0.75% after ten minutes at 70° C. and another 0.75% after twenty minutes at 70° C. Again, these percentages were based on the weight of the pulp fiber. The pulp slurry was agitated during treatment. The toner and ink migrated to the prills and the prills were removed from the slurry.

EXAMPLE 3

Waste xerographic copy paper was pulped and diluted to a consistency of 4% and agitated during the treatment. 2% sodium hydroxide and 4% polystyrene prills were added to the slurry and the slurry was heated. 1% 1-octanol was added to slurry when it reached a temperature of 40°-45° C. and 0.5% was added ten minutes after the slurry reached a temperature of 70° C. The slurry was held at 70° C. for a total of 20 minutes. All percentages are based on the weight of the pulp fibers in the slurry.

What is claimed is:

1. The method of removing toner from electrophotographic copy paper containing said toner comprising
    pulping said paper containing said toner to form an aqueous pulp and toner slurry which is mixable,
    adding to said pulp slurry from 0.25 to 5% of the weight of the pulp fiber of a solid material selected from the group consisting of polystyrene, polyvinyl chloride, polyurethane, polypropylene, and polyacrylates,
    adding to said pulp slurry at least 0.75% of the weight of the pulp fiber a chemical which is substantially insoluble in water, has a melting point which is in the range of the approximate melting point of said solid material and 75°, and is selected from a group consisting of a saturated aliphatic primary alcohol, a mixture of said primary alcohols, an unsaturated aliphatic primary alcohol, a mixture of said unsaturated alcohols, a saturated aliphatic secondary alcohol, a saturated aliphatic primary hydrocarbon, a mixture of said hydrocarbons, and a mixture of said hydrocarbons and said alcohols,
    maintaining the temperature of said slurry at at least the melting point of said chemical for a period of at least one minute, and
    after said period, removing said solid material and toner from said slurry.
2. The method of claim 1 in which said saturated aliphatic primary alcohol has a chain length of 8 through 22 carbon atoms.
3. The method of claim 1 in which said unsaturated aliphatic primary alcohol has a chain length of 8 through 22 carbon atoms.
4. The method of claim 1 in which said saturated aliphatic secondary alcohol has a chain length of 8 carbon atoms.
5. The method of claim 1 in which said saturated aliphatic primary hydrocarbon has a chain length of 7 through 28 carbon atoms.
6. The process of claims 1, 2, 3, 4 or 5 in which the temperature of the process is in the range of the melting point of said chemical and 100° C.
7. The process of claims 1, 2, 3, 4 or 5 in which the temperature of the process is in the range of 30° and 100° C.
8. The process of claims 1, 2, 3, 4 or 5 in which the temperature of the process is in the range of 40° and 80° C.
9. The process of claims 1, 2, 3, 4 or 5 in which the time of the process is in the range of one minute and one hour.
10. The process of claims 1, 2, 3, 4 or 5 in which the time of the process is in the range of ten and thirty minutes.

* * * * *